United States Patent
Kolmanovsky et al.

[11] Patent Number: 6,095,127
[45] Date of Patent: Aug. 1, 2000

[54] FUEL LIMITING METHOD IN DIESEL ENGINES HAVING EXHAUST GAS RECIRCULATION

[75] Inventors: Ilya V. Kolmanovsky, Ypsilanti; Mrdjan J. Jankovic, Birmingham; Michiel J. Van Nieuwstadt, Ann Arbor, all of Mich.; Paul Eduard Moraal, Wuerselen, Germany

[73] Assignee: Ford Global Technologies, Inc., Dearborn, Mich.

[21] Appl. No.: 09/237,426

[22] Filed: Jan. 26, 1999

[51] Int. Cl.$^7$ .............................. F02M 25/07; F02D 43/04
[52] U.S. Cl. .................... 123/676; 123/480; 123/568.21; 701/104; 701/108
[58] Field of Search .................................. 123/357, 446, 123/480, 672, 676, 568.21; 60/601, 602, 605.2; 701/104, 108

[56] References Cited

U.S. PATENT DOCUMENTS

| | | | |
|---|---|---|---|
| 5,076,237 | 12/1991 | Hartman et al. | 123/672 |
| 5,123,246 | 6/1992 | Younessi | 60/602 |
| 5,228,292 | 7/1993 | Hanauer | 60/602 |
| 5,273,019 | 12/1993 | Matthews | 123/406.48 |
| 5,505,174 | 4/1996 | Komoriya | 123/406.48 |
| 5,520,161 | 5/1996 | Klopp | 123/676 |
| 5,535,135 | 7/1996 | Bush et al. | 701/109 X |
| 6,035,640 | 3/2000 | Kolmanovsky et al. | 60/605.2 |

FOREIGN PATENT DOCUMENTS 0 774 574 A1   5/1997   European Pat. Off. .

*Primary Examiner*—Tony M. Argenbright
*Attorney, Agent, or Firm*—Jerome R. Drouillard

[57] ABSTRACT

A method of controlling the fueling rate of a compression ignition engine having an exhaust gas recirculation system (EGR) and a turbocharger. The method includes the steps of predicting the exhaust gas air/fuel ratio as a function engine operating characteristics and the operator-requested fueling rate. This value is compared to an air/fuel limit value stored in a table of values indexed by engine operating characteristics. The air/fuel limit is the value below which visible smoke occurs. The predicted air/fuel ratio is compared to the air/fuel ratio limit and either (1) the fuel is delivered at the requested rate, (2) the start of injection timing is modified and the fuel is delivered at the requested rate or (3) the fueling rate is limited as a function of the requested fueling rate and measured or determined engine operating parameters.

15 Claims, 4 Drawing Sheets

FUEL LIMITING METHOD IN DIESEL ENGINES HAVING EXHAUST GAS RECIRCULATION

TECHNICAL FIELD

This invention relates to compression ignition engines having exhaust gas recirculation systems and, more particularly, to methods of limiting fuel delivery to avoid visible smoke in turbocharged diesel engines equipped with exhaust gas recirculation (EGR) systems.

BACKGROUND OF THE INVENTION

High performance, high speed diesel engines are often equipped with turbochargers to increase power density over a wider engine operating range, and EGR systems to reduce the production of NOx emissions.

Turbochargers use a portion of the exhaust gas energy to increase the mass of the air charge delivered to the engine combustion chambers. The larger mass of air can be burned with a larger quantity of fuel, thereby resulting in increased power and torque as compared to naturally aspirated engines.

A typical turbocharger consists of a compressor and turbine coupled by a common shaft. The exhaust gas drives the turbine which drives the compressor which, in turn, compresses ambient air and directs it into the intake manifold. Variable geometry turbochargers (VGT) allow the intake airflow to be optimized over a range of engine speeds. This is accomplished by changing the angle of the inlet guide vanes on the turbine stator. An optimal position for the inlet guide vanes is determined from a combination of desired torque response, fuel economy, and emissions requirements.

EGR systems are used to reduce NOx emissions by increasing the dilution fraction in the intake manifold. EGR is typically accomplished with an EGR valve that connects the intake manifold and the exhaust manifold. In the cylinders, the recirculated exhaust gas acts as an inert gas, thus lowering the flame and in-cylinder gas temperature and, hence, decreasing the formation of NOx. On the other hand, the recirculated exhaust gas displaces fresh air and reduces the air-to-fuel ratio of the in-cylinder mixture.

Both the VGT and EGR regulate gas flow from the exhaust manifold, and their effect is, therefore, coupled through the conditions in the exhaust manifold. Excessive EGR rates displace the intake of fresh air and may lead to incomplete combustion of the injected fuel which, in turn, could cause visible levels of smoke and increased levels of emissions. Moreover, this could negatively affect fuel economy and/or performance. Thus, for effective control of diesel engines with EGR systems, it is necessary to control the EGR flow precisely, not only in steady state but also in transient conditions. Precise EGR control requires monitoring the EGR flow, the fresh air flow, and the intake mixture composition to control the combustion process and, thereby, avoid smoke production and particulate emissions.

Conventionally, fuel demand is calculated as a function of engine speed and accelerator pedal position, and fueling rate limiters restrict the actual amount of fuel injected as a calibrated function of intake manifold pressure (MAP), intake manifold temperature, and engine speed (RPM) to avoid smoke. Thus, such systems operate without regard to measurements or estimates of the amount of fresh air or oxygen available in the intake manifold. In particular, fuel limiting is conventionally accomplished as a function of charge density, without regard to charge composition, or as a function of compressor mass airflow, without regard to the additional oxygen contributed by the EGR flow.

Knowledge of the amount of fresh air available for combustion in the intake manifold, however, is important. In a diesel engine, the generated torque is directly proportional to the amount of injected fuel, provided enough air is available. Visible smoke is also strongly related to the air/fuel ratio. Consequently, it is desirable to deliver fuel to the engine at a rate which generates the torque demanded by the driver, yet maintains the air/fuel ratio above the threshold at which visible smoke occurs.

DISCLOSURE OF THE INVENTION

One object of the present invention is to provide a fast airflow response while maintaining the air/fuel ratio above the threshold at which smoke occurs.

Another object is to control fuel injection quantity and timing to avoid smoke generation.

The invention is advantageous in that it improves system performance by dynamically estimating intake manifold oxygen concentration, allowing for faster airflow response without visible smoke and hence, reduced turbo lag.

According to the present invention, the foregoing and other objects and advantages are obtained by a method of controlling the fueling rate of a compression ignition engine having an EGR system and a turbocharger. The method comprises the steps of generating a turbocharger intake airflow value ($W_{c1}(k)$), an EGR flow value ($W_{21}(k)$) and engine intake airflow value ($W_{1e}(k)$). From these measured or estimated values, the intake burnt gas fraction is calculated as a function of $W_{c1}(k)$ and $W_{21}(k)$. Once the intake burnt gas fraction value is obtained, the start of fuel injection signal and requested fueling rate are determined as a function of pedal position, engine speed and possibly other engine operating conditions. A predicted exhaust gas air/fuel ratio ($\lambda_e(k)$) is then generated as a function of $W_{1e}(k)$ and the requested fueling rate. Furthermore, an air/fuel ratio limit $\lambda_{lim}(k)$ is determined from a stored lookup table based on engine operating conditions. This is the air/fuel ratio limit below which visible exhaust smoke will occur. The predicted exhaust gas air/fuel ratio is compared to the exhaust gas air/fuel ratio limit ($\lambda_{lim}(k)$) necessary to avoid smoke. If $\lambda_e(k) \geq \lambda_{lim}(k)$ fuel is delivered at the requested rate. Otherwise, the start of fuel injection value is modified to increase the exhaust gas air/fuel ratio limit. This new exhaust gas air/fuel ratio limit is then compared to $\lambda_e(k)$. If $\lambda_e(k) \geq \lambda_{lim,new}(k)$, the start of injection timing value is modified and fuel is delivered at the requested rate, otherwise, the fuel is limited as a function of the intake burnt gas fraction, $W_{ie}(k)$ and $\lambda_{lim,new}(k)$.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should now be had to the embodiments illustrated in greater detail in the accompanying drawings and described below by way of examples of the invention. In the drawings.

DESCRIPTION OF THE PREFERRED EMBODIMENT

Figure 1:
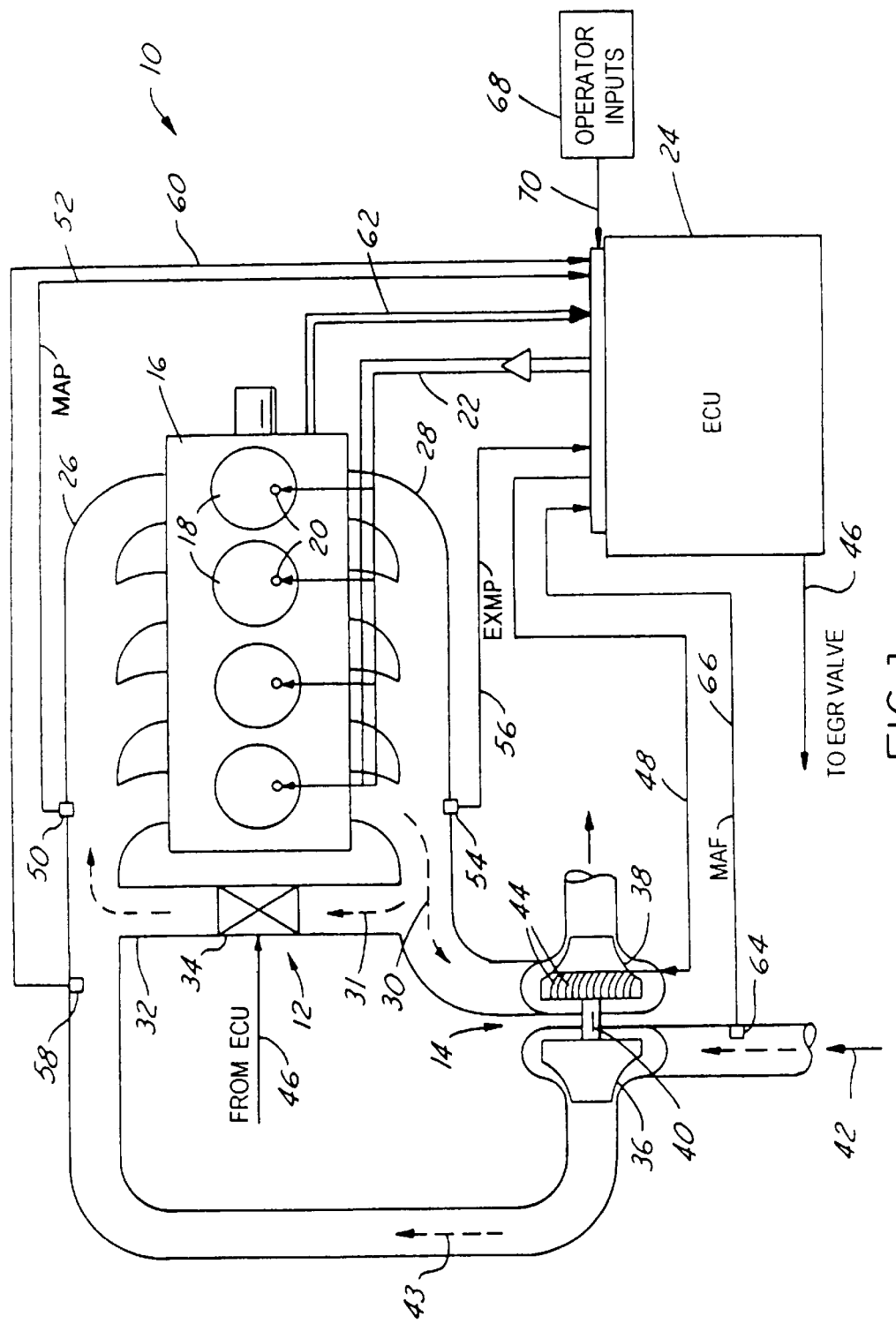
FIG. 1 is a schematic view of a compression ignition engine system having an EGR system and a VGT in accordance with one embodiment of the present invention.

Turning first to FIG. 1, there is shown a simplified schematic diagram of a compression ignition engine system 10 equipped with an exhaust gas recirculation (EGR) system 12 and a variable geometry turbocharger (VGT) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of NOx emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the inake manifold 26 in the direction of arrow 31. An EGR valve 34 regulates the amount of exhaust gas recirculated from the exhaust manifold 28. In the combustion chambers, the recirculated exhaust gas acts as an inert gas, thus lowering the flame and in-cylinder gas temperature and decreasing the formation of NOx. On the other hand, the recirculated exhaust gas displaces fresh air and reduces the air-to-fuel ratio of the in-cylinder mixture.

The turbocharger 14 uses exhaust gas energy to increase the mass of the aircharge delivered to the engine combustion chambers 18. The exhaust gas flowing in the direction of arrow 30 drives the turbocharger 14. This larger mass of air can be burned with a larger quantity of fuel, resulting in more torque and power as compared to naturally aspirated, non-turbocharged engines.

The turbocharger 14 consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. The VGT 14 can be modified during engine operation by varying the turbine flow area and the angle at which the exhaust gas 30 is directed at the turbine blades. This is accomplished by changing the angle of the inlet guide vanes 44 on the turbine 38. The optimal position for the inlet guide vanes 44 is determined from the desired engine operating characteristics at various engine speeds.

As can be appreciated from FIG. 1, both the EGR 12 and the VGT 14 regulate gas flow from the exhaust manifold 28. The effect of the EGR and VGT is, therefore, jointly dependent upon the conditions in the exhaust manifold 28.

All of the engine systems, including the EGR 12, VGT 14 and fuel injectors 20 are controlled by the ECU. For example, signal 46 from the ECU 24 regulates the EGR valve position, and signal 48 regulates the position of the VGT guide vanes 44.

In the ECU 24, the command signals 46, 48 to the EGR 12 and VGT 14 actuators are calculated from measured variables and engine operating parameters by means of a control algorithm. Sensors and calibratable lookup tables provide the ECU 24 with engine operating information. For example, manifold absolute pressure (MAP) sensor 50 provides a signal 52 to the ECU 24 indicative of the pressure in the intake manifold 26. Likewise, exhaust manifold pressure (EXMP) sensor 54 provides an EXMP signal 56 to the ECU 24 indicative of the pressure in the exhaust manifold 28. Further, an aircharge temperature sensor 58 provides a signal 60 to the ECU 24 indicative of the temperature of the intake aircharge 42. A mass airflow (MAF) sensor 64 also provides a signal 66 indicative of the compressor intake airflow to the ECU 24. Additional sensory inputs can also be received by the ECU along signal line 62 such as engine coolant temperature, engine speed, and throttle position. Additional operator inputs 68 are received along signal 70 such as acceleration pedal position. Based on the sensory inputs and engine mapping data stored in memory, the ECU controls the EGR valve to regulate the intake airflow (MAF), controls the VGT to regulate the intake manifold pressure (MAP) and controls injectors 20 to regulate fuel delivery.

Figure 2:
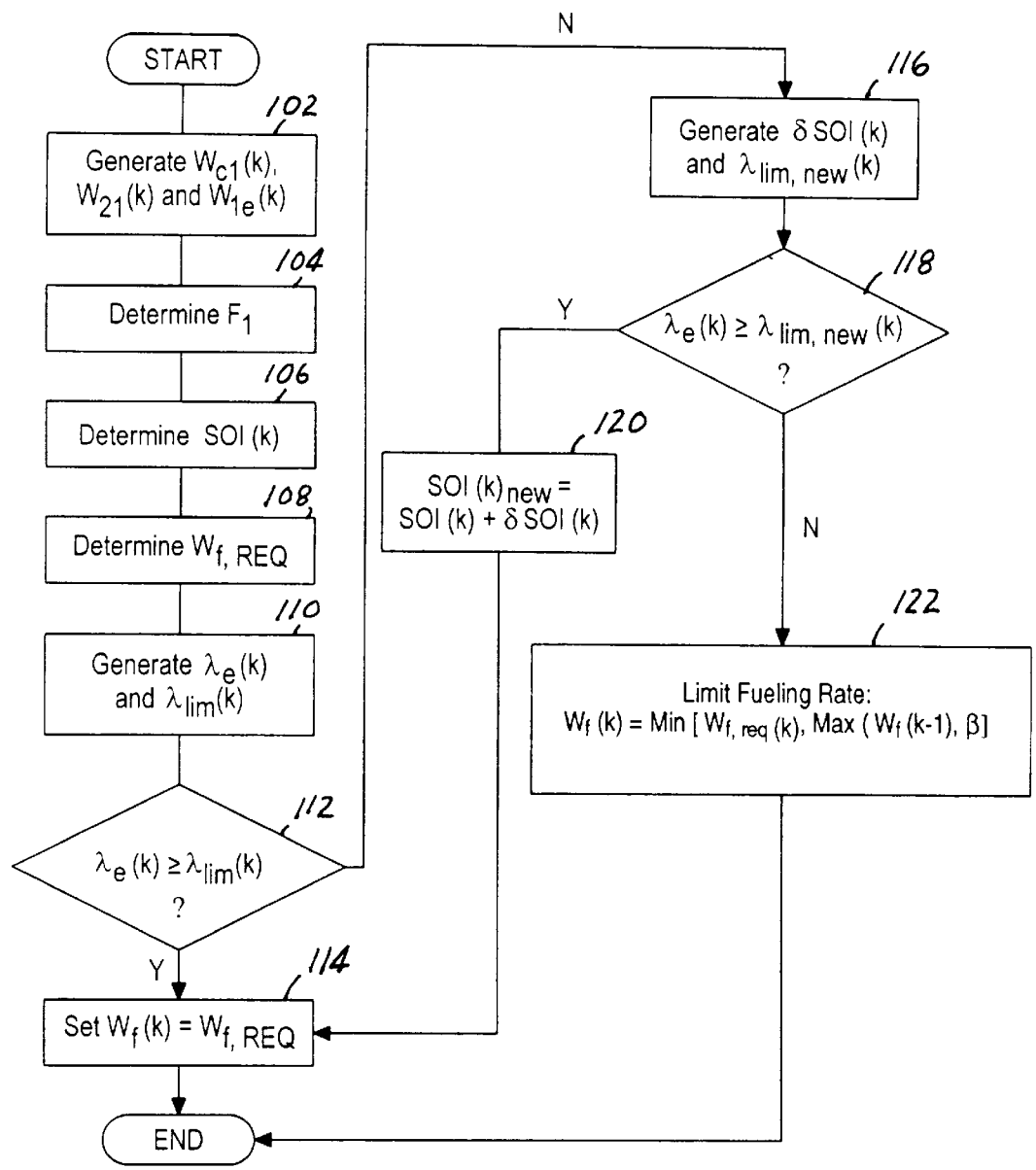
FIG. 2 is a logic diagram describing a method of controlling the engine fueling rate in accordance with one embodiment of the present invention.

FIG. 2 describes the logic flow of the ECU to regulate fuel delivery to avoid the production of smoke.

Throughout the specification, the following notations are used in describing measured or calculated variables:

| | |
|---|---|
| p | pressure (kPa) |
| T | temperature (K) |
| m | mass (kg) |
| W | mass flow (kg/s) |
| F | burnt gas fraction |
| $\alpha_{egr}$ | EGR valve position |

Furthermore, the following subscripts are used to denote regions of the engine system:

| | |
|---|---|
| 1 | intake manifold 26 |
| 2 | exhaust manifold 28 |
| e | engine block 16 |
| t | turbine 38 |
| c | compressor 36 |

Finally, the following thermodynamic constants are referenced for air at 300 K:

$$c_p = 1.0144 \text{ kJ/kg/}K \qquad R = c_p - c_v$$

$$c_v = 0.7274 \text{ kJ/kg/}K \qquad \gamma = c_p / c_v$$

$$\Phi_s = 1/14.4$$

Hence, the symbol $p_1$, for example, refers to the intake manifold pressure in kPa. Combined subscripts, such as "e2", refer to flows from the first to the second subsystem.

FIG. 2 describes the logic routine to accomplish fuel limiting based on estimates of intake and exhaust aircharge composition. This logic routine resides in the ECU memory and is executed as part of the routine used to control the timing and duty cycle of the fuel injectors 20.

In step 102, the VGT compressor airflow ($W_{c1}(k)$), EGR flow rate ($W_{21}(k)$) and engine intake flow ($W_{1e}(k)$) are computed.

The compressor airflow ($W_{c1}(k)$) can be measured by MAF sensor 64 (FIG. 1), or can be estimated based on measurements of intake manifold pressure from MAP sensor 50, exhaust manifold pressure from EXMP sensor 54, and the EGR valve position.

The EGR flow value ($W_{21}(k)$) is calculated as a function of intake manifold pressure ($p_1$), exhaust manifold pressure ($p_2$), the EGR temperature ($T_{21}$), and EGR valve position ($\alpha_{egr}$) according to the following equation:

$$W_{21}(k) = f_1(\alpha_{egr})p_2/(RT_{21})^{1/2}\phi(p_1/p_2) \quad (1)$$

The EGR temperature ($T_{21}$) is determined from a steady-state map based on engine operating conditions. Alternatively, $T_{21}$ can be assumed to be a constant. The air charge temperature ($T_{c1}$) can also be measured by a temperature sensor such as sensor 58 of FIG. 1, or estimated based on engine operating conditions.

In equation (1), $f_1(\alpha_{egr})$ represents the effective flow area of the EGR valve as a function of the position of the EGR valve, R represents the difference between the pressure specific heat constant and volume specific heat constant, and $\phi$ represents a standard orifice equation having the following form:

$$\phi(r) = [(2\gamma/(\gamma-1))(r^{2/\gamma} - r^{(\gamma+1)/\gamma}]^{1/2} \text{ for } r \geq (2/(\gamma+1))^{\gamma/(\gamma-1)}$$

$$\phi(r) = \gamma^{1/2}(2/(\gamma+1))^{(\gamma+1)/(2(\gamma-1))} \text{ for } r < (2/(\gamma+1))^{\gamma/(\gamma-1)}$$

The flow out of the intake manifold into the combustion chambers ($W_{1e}(k)$) is then given by:

$$W_{1e}(k) = (NV_d n_{vol}/(RT_1 120))p_1 \quad (2)$$

wherein N represents the engine speed, $V_d$ represents the displacement volume of the engine, and $n_{vol}$ represents the volumetric efficiency of the engine. The volumetric efficiency is stored in the ECU memory as a function of one or more of the following variables: intake manifold pressure, intake manifold temperature, fuel rate, engine speed, and engine coolant temperature.

Given a measured value of the compressor flow rate ($W_{c1}(k)$), the EGR flow rate ($W_{21}(k)$) can also be estimated. The time rate of change of the intake pressure can be expressed as:

$$dp_1/dt = -Ap_1 + (R_\gamma/V_1)(W_{c1}T_{c1} + W_{21}T_{21}) \quad (3)$$

where $$A = (NV_d n_{vol}/(V_1 120)) \quad (4)$$

Thus, from equation (3), the only unknown term is the EGR flow rate $W_{21}$. An observer is, therefore, constructed to dynamically estimate the product $W_{21}T_{21}$ by interpreting the scaled enthalpy flow as the state of a dynamic system whose dynamics are assumed to be zero. Assume the state of the estimator is the scaled enthalpy flow, $z = W_{21}T_{21}$, and letting $\underline{p_1}$ and $\underline{z}$ be estimates of intake manifold pressure and z, respectively, a pressure error term and flow error term can be defined as follows:

$$e_p = p_1 - \underline{p_1}$$

$$e_z = z - \underline{z}$$

The following differential equations are then observers for manifold pressure and scaled enthalpy flow:

$$d\underline{p_1}/dt = -(A+MA)\underline{p_1} + MAp_1 + (R_{65}/V_1)(W_{c1}T_{c1} + \underline{z}) \quad (5)$$

$$d\underline{z}/dt = L(p_1 - \underline{p_1}) \quad (6)$$

where L and M are calibratable constants whose value is >0. The error dynamics for equations (5) and (6) are:

$$de_p/dt = -(1+M)Ae_p + (R_{65}/V_1)(e_z) \quad (7)$$

$$de_z/dt = -Le_p \quad (8)$$

Appropriate values for the design parameters M and L can be determined; a requirement being that the eigenvalues of the error system are in the left half complex plane. For example, assuming M=0.5, L=0.5, and $V_1$=0.003 m$^3$, and the engine operating conditions are yielding $n_{vol}$=0.85, the eigenvalues are given by $-7.3353$ and $-4.5647$.

The estimate of the EGR flow value ($W_{21}$) is then given by the following equation:

$$W_{21} = \underline{z}/T_{21} \quad (9)$$

In order to implement equation (9) in the digital ECU, it can be discretized with a sufficiently small sampling period $\delta t$. In such a case, the value of $W_{21}$ is governed by the following equations:

$$\underline{p_1}(k+1) = \underline{p_1}(k) + \delta t[-(A+MA)\underline{p_1}(k) + MAp_1(k) + (R_\gamma/V_1) \ldots$$

$$(W_{c1}(k)T_{c1}(k) + \underline{z}(k))] \quad (10)$$

$$\underline{z}(k+1) = \underline{z}(k) + \delta t[L(p_1(k) - \underline{p_1}(k))] \quad (11)$$

$$W_{21}(k) = \underline{z}(k)/T_{21}(k) \quad (12)$$

Alternatively, the EGR flow value can be defined on the basis of the ideal gas law—instead of the first law of thermodynamics as in equations (4) and (12)—as follows:

$$\underline{p_1}(k+1) = \underline{p_1}(k) + \delta t[-(1/\gamma)(A + M'A)\underline{p_1}(k) + \ldots (M'A/\gamma)p_1(k) + (RT_1(k)/V_1)(W_{c1}(k) + \underline{z}(k))] \quad (13)$$

$$\underline{z}(k+1) = \underline{z}(k) + \delta t[L'(p_1(k) - \underline{p_1}(k))] \quad (14)$$

$$W_{21}(k) = \underline{z}(k) \quad (15)$$

where M' and L' may be different from M and L.

In accordance with another embodiment of the invention, $W_{21}$ can be calculated by another method based on the first law of thermodynamics wherein the following equation defines the intake manifold pressure:

$$dp_1/dt = (R_\gamma/V_1)(W_{c1}T_{c1} + W_{21}T_{21} - W_{1e}T_1) \quad (16)$$

Applying a Laplace transform to both sides of equation (16) and multiplying equation (16) by $1/(s/\tau+1)$ results in the following equation:

$$sp_1/(s/\tau+1) = (R_\gamma/V_1)(1/(s/\tau+1))(W_{c1}T_{c1} + W_{21}T_{21} - W_{1e}T_1) \quad (17)$$

From equation (17) estimates for the time rate of change of the intake pressure and EGR flow can be defined as follows:

$$\underline{dp_1/dt} = sp_1/(s/\tau+1) \quad (18)$$

$$\underline{W_{21}} = W_{21}/(s/\tau+1) \quad (19)$$

$$\underline{f} = (1/(s/\tau+1))(W_{c1}T_{c1} - W_{1e}T_1) \quad (20)$$

Substituting these values in equation (17), the filtered EGR flow, $W_{21}$, is defined as:

$$\underline{W_{21}} = (1/T_{21})((V_1/(\gamma R))\underline{dp_1/dt} - \underline{f}) \quad (21)$$

Intake pressure, $p_1$, and intake aircharge temperature, $T_{c1}$, are measured values from MAP sensor 50 and temperature sensor 58 of FIG. 1. The remaining variables are known or can be resolved. For example, the intake mass airflow, $W_{c1}$, is obtained from MAF sensor 64. Similarly, the engine intake flow rate, $W_{1e}$, is obtained from the mapped volumetric efficiency, measured intake manifold pressure, and engine speed as in equation (2). Also, the EGR temperature $T_{21}$, can be taken as a constant, or mapped as a function of measured engine operating conditions. Finally, the intake manifold temperature, $T_1$, is obtained from the steady state equation:

$$T_1 = (W_{c1}T_{c1} + W_{21}T_{21})/(W_{c1}+W_{21}) \quad (22)$$

Preferably, to implement the control logic in the digital ECU, the logic can be sampled over discrete time periods, $\delta t$, resulting in the following controller equations:

$$d(k+1) = d(k) + \delta t(-\tau d(k) + p_1(k)) \quad (23)$$

$$\underline{dp_1(k)/dt} = \tau(p_1(k) - \tau d(k)) \quad (24)$$

$$\underline{f}(k+1) = \underline{f}(k) + \delta t(-\tau \underline{f}(k) + \tau(W_{c1}(k)T_{c1}(k) - W_{1e}(k)T_1(k))) \quad (25)$$

$$\underline{W_{21}}(k) = (1/T_{21}(k))((V_1/(\gamma R))(\underline{dp_1(k)/dt}) - \underline{f}(k)) \quad (26)$$

wherein $V_1$ represents the volume of the intake manifold, $\underline{dp_1(k)/dt}$ represents an estimate of the time rate of change of the intake manifold pressure, $\underline{f}(k)$ represents the filtered difference between the compressor mass air flow enthalphy and engine intake flow enthalpy, and $T_{21}(k)$ represents the EGR temperature.

As a further embodiment, the EGR flow value can be defined on the basis of the ideal gas law, instead of the first law of thermodynamics as in equations (16), (25) and (26), as follows:

$$d(k+1) = d(k) + \delta t(-\tau d(k) + p_1(k)) \quad (27)$$

$$\underline{dp_1(k)/dt} = \tau(p_1(k) - \tau d(k)) \quad (28)$$

$$\underline{f}(k+1) = \underline{f}(k) + \delta t(-\tau \underline{f}(k) + \tau(W_{c1}(k) - W_{1e}(k))) \quad (29)$$

$$\underline{W_{21}}(k) = (V_1/RT_1(k)) \underline{dp_1(k)/dt} - \underline{f}(k) \quad (30)$$

wherein $V_1$ represents the volume of the intake manifold, $T_1(k)$ represents the temperature of the intake manifold, $\underline{dp_1(k)/dt}$ represents an estimate of the time rate of change of the intake manifold pressure, and $\underline{f}(k)$ represents the filtered difference between the compressor mass flow rate and engine intake flow rate.

Figure 3A:
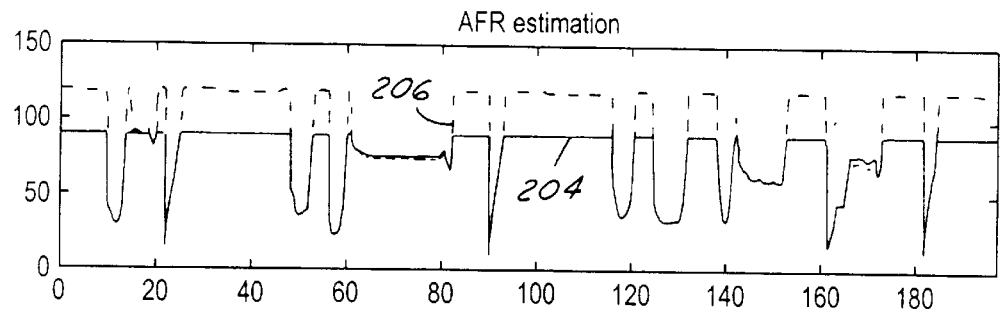
FIGS. 3a–c are graphs illustrating estimated values according to one embodiment of the fuel limiting method.
Figure 3B:
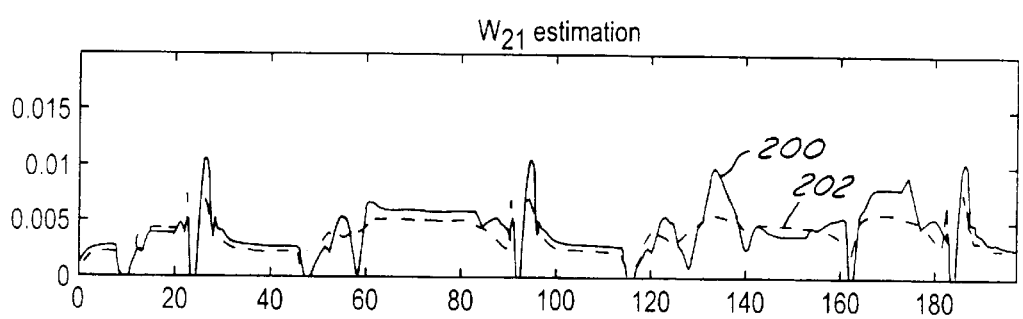

The performance of the EGR flow rate estimator as defined by equation (12) is illustrated in FIG. 3b. FIG. 3b shows a graph of estimated $W_{21}$ using equation (12) (line 202) versus the simulated actual $W_{21}$ (line 200) over a period of 200 seconds.

From step 102, it is advantageous to have knowledge of the EGR mass flow rate $W_{21}$ because it allows for a more precise, or less conservative, fuel limiting scheme. Specifically, the composition of the intake aircharge and the amount of oxygen contributed by the EGR flow are taken into account in deciding whether to limit the fueling rate in order to avoid the production of smoke. This process is carried out by the ECU in steps 104 through 122.

At step 104, the intake burnt gas fraction $F_1$ is estimated. The differential equation governing the dynamics of the burnt gas fraction in the intake manifold is based on a mass balance and is defined as:

$$dF_1/dt = 1/m_1[-(W_{c1}+W_{21})F_1 + W_{21}F_2] \quad (31)$$

The mass in the intake manifold is obtained using the ideal gas law, and substituting in equation (31) to obtain:

$$dF_1/dt = (RT_1/(p_1V_1))[-(W_{c1}+W_{21})F_1 + W_{21}F_2] \quad (32)$$

Figure 3C:
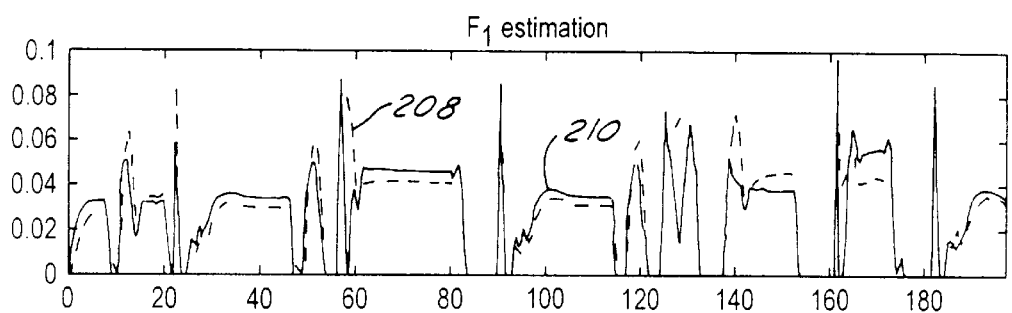

It is evident that equation (32) is stable. Hence, a direct integration of the right hand side yields a stable open-loop observer for $F_1$. The results of this observer for the intake burnt gas fraction are demonstrated in FIG. 3c. In FIG. 3c, line 208 graphs the estimated intake burnt gas fraction from equation (32), and line 210 represents the simulated actual intake burnt gas fraction.

In step 106, the start of fuel injection (SOI(k)) value is determined as a function of engine speed and fueling rate from a lookup table stored in the ECU memory.

In step 108, the requested fueling rate ($W_{f,REQ}$) is determined as a function of engine speed and accelerator pedal position from a lookup table stored in the ECU memory.

Given the estimation of intake composition from equation (32), the fuel supply can be limited to keep the resulting air/fuel ratio above a predetermined value to avoid the production of smoke. In step 108, this air/fuel ratio limit $\lambda_{lim}$ is generated as a calibrated function of SOI(k), and one or more engine operating parameters such as engine speed, intake manifold pressure, engine coolant temperature, and fueling rate.

The exhaust burnt gas fraction ($F_e$), intake manifold burnt gas fraction ($F_1$), and predicted exhaust air/fuel ratio ($\lambda_e$), are given by:

$$F_e(k) = (F_1(k)W_{1e}(k) + W_f(k)(1 + 1/\Phi_s))/ \ldots (W_{1e}(k) + W_f(k)) \quad (33)$$

$$F_1(k+1) = F_1(k) + \quad (34)$$
$$\delta t(RT_1(k)/(p_1(k)V_1)) \ldots [-(W_{c1}(k) + W_{21}(k))F_1(k) + W_{21}(k)F_2(k)]$$

$$F_2(k+1) = F_2(k) + \delta t(1/T_{F21}(-F_2(k) + F_e(k-T))) \quad (35)$$

$$\lambda_e(k) = [(1 - (F_1(k)/(\Phi_s + 1))W_{1e}(k)]/ \quad (36)$$
$$\ldots [F_1(k)W_{1e}(k)/(\Phi_s + 1) + W_{f,REQ}(k)]$$

In this fuel control strategy, $W_{c1}(k)$ is measured or estimated, $W_{21}(k)$ is calculated as shown in equations (12) (15), (26) or (30), and $W_{1e}(k)$ is determined by equation (2). The requested fueling rate is also known. The variable T represents the number of time samples associated with the combined cycle delay and transport delay of the air/fuel mixture as it is inducted into the engine, combusted, exhausted into the exhaust manifold, and recirculated into the intake manifold through the EGR system. The time constant $\tau_{F21}$ represents the mixing of gases in the exhaust manifold and EGR path. Both of these time constants can be readily determined from engine mapping.

Alternatively, equation (34) can be substituted with a different filter given by the following equations:

$$F_{1,pre}(k) = F_2(k)W_{21}(k)/(W_{c1}(k)+W_{21}(k)) \quad (37)$$

$$F_1(k+1) = F_1(k) + \delta t(1/\tau_{F1}(-F_1(k)+F_{1,pre}(k))) \quad (38)$$

wherein $\tau_{F1}$ is a time constant representative of mixing of the gases in the intake manifold.

The performance of the estimated exhaust air/fuel ratio as described by equation (36) is shown in FIG. 3a. The simulated exhaust air/fuel ratio is shown by line 204 and the estimated exhaust air/fuel ratio is shown by line 206. It can be seen from the graph of FIG. 3a that the estimated exhaust air/fuel ratio tracked very closely with the simulated value with the exception that the simulation model became saturated at 90 and the estimator saturated at 120.

Step 112 compares the estimated exhaust air/fuel ratio and the air/fuel ratio limit necessary to avoid the production of smoke. If the predicted air/fuel ratio limit exceeds the limiting air/fuel ratio, the engine is operating in normal mode and the delivered fuel rate $W_f(k)$ is set equal to the requested fueling rate (step 114).

If, however, the estimated exhaust air/fuel ratio is less than the air/fuel ratio limit, a change in the start of fuel injection ($\delta SOI(k)$) timing is determined to be added to the standard injection timing ($SOI(k)$) to achieve a higher exhaust air/fuel ratio limit ($\lambda_{lim,new}(k)$) (step 116). The change in injection timing is determined from a lookup table stored in the ECU memory and can be either a positive or negative value. The new exhaust air/fuel ratio limit ($\lambda_{lim,new}(k)$) is then generated as a calibrated function of $SOI(k)+\delta SOI(k)$, and one or more engine operating parameters.

The new air/fuel limit is then compared with the estimated exhaust air/fuel ratio in step 118. If the estimated exhaust air/fuel ratio is above the threshold represented by the new air/fuel ratio limit, the fuel injection timing is modified in step 120, and the fueling rate is set equal to the desired fueling rate in step 114. Otherwise the fuel is limited in step 122 according to the following equations:

$$B = ((1-F_1(k))W_{1e}(k)/\lambda_{lim,new}(k)) - (F_1(k))W_{1e}(k)/(\Phi_s+1)) \quad (39)$$

and $$W_f(k) = \min[W_{f,REQ}(k), \max(W_f(k-1), B)] \quad (40)$$

Additionally, the ECU preferably commands the EGR system and VGT to increase the available fresh air intake to maintain the air/fuel ratio above the limit at which smoke occurs.

Figure 4A:
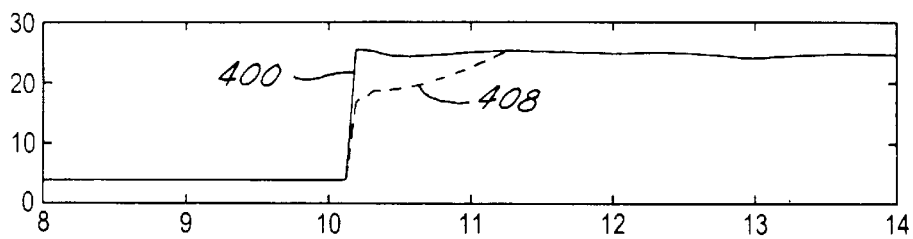
FIGS. 4a–e are graphs illustrating the performance of the fuel limiting method of one embodiment of the present invention.
Figure 4B:
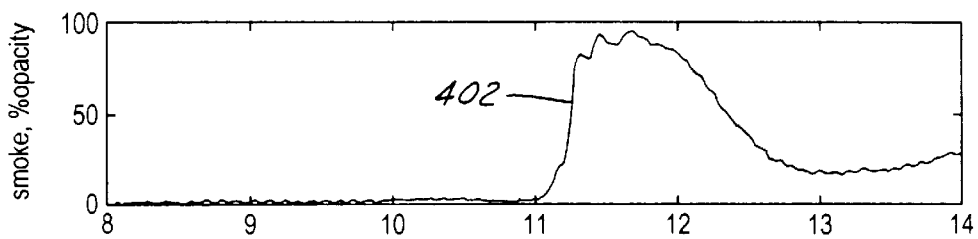
Figure 4C:
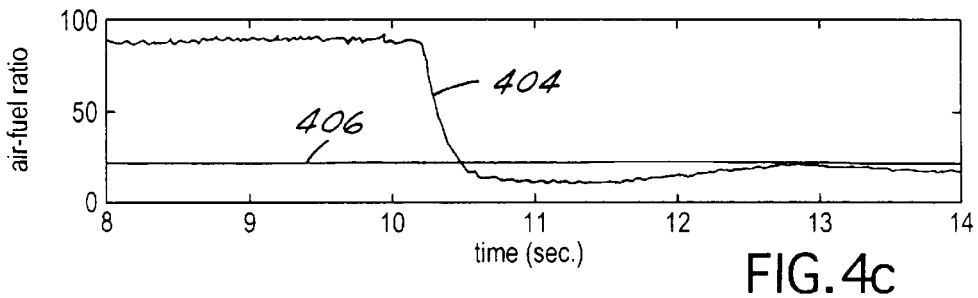
Figure 4D:
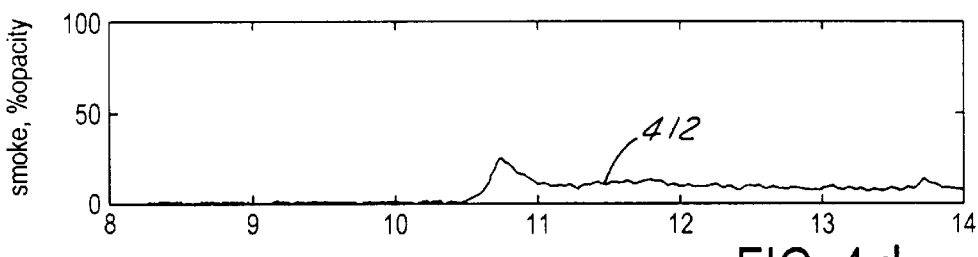
Figure 4E:
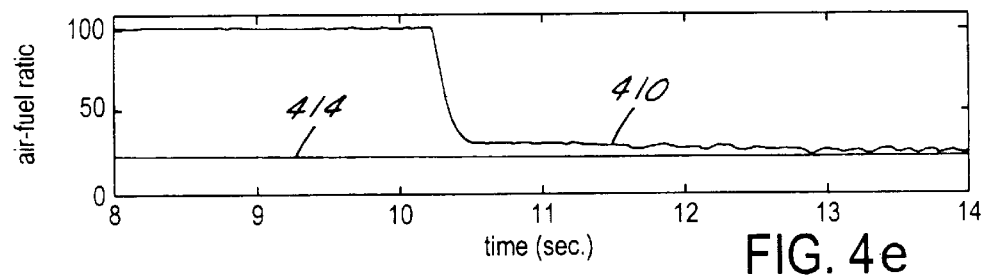

The performance of the novel fuel limited method is illustrated in FIGS. 4a through 4e. In FIG. 4a, line 400 shows the requested fueling rate in milligrams per stroke. FIGS. 4b and 4c show the resulting smoke in percent opacity (line 402) and exhaust air/fuel ratio (line 404) without the disclosed fuel limiting method. Line 406 of FIG. 4c represents the air/fuel ratio limit above which visible smoke occurs. FIGS. 4d and 4e illustrate the same variables at the same operating point where the novel fuel limiting scheme is used. As can be appreciated, when the fuel is limited (line 408 of FIG. 4a), the exhaust air/fuel ratio (line 410 of FIG. 4e) is maintained above the level at which visible smoke occurs (line 414 of FIG. 4e). Accordingly, the opacity of the smoke (line 412 of FIG. 4d) is maintained below the visible level.

While the invention has been described in connection with one or more embodiments, it will be understood that the invention is not limited to those embodiments. For example, although the engine system described includes a variable geometry turbocharger, the disclosed method would equally apply to engine systems with fixed geometry turbochargers or naturally aspirated engines as well. Accordingly, the invention covers all alternatives, modifications, and equivalents, as may be included within the spirit and scope of the appended claims.

What is claimed is:

1. A method of controlling the fueling rate of a compression ignition engine having an exhaust gas recirculation (EGR) system having an EGR valve connecting an intake manifold and exhaust manifold of the engine, and a turbocharger including a compressor and a turbine, the method comprising the steps of:

generating a compressor airflow value ($W_{c1}(k)$) indicative of the mass airflow into the turbocharger compressor;

generating a recirculation flow value ($W_{21}(k)$) indicative of the flow of exhaust gas through the EGR system;

generating an intake flow value ($W_{1e}(k)$) indicative of the flow from the intake manifold into the engine;

generating an intake burnt gas fraction value ($F_1(k)$);

determining a start of fuel injection value ($SOI(k)$) as a function of engine speed and fueling rate;

determining the requested fueling rate ($W_{f,REQ}$) as a function of accelerator pedal position and engine speed;

determining a predicted exhaust gas air/fuel ratio ($\lambda_e(k)$);

generating an exhaust gas air/fuel ratio limit ($\lambda_{lim}(k)$); and delivering fuel to the engine ($W_f(k)$) as a function of $\lambda_e(k)$, $\lambda_{lim}(k)$, $SOI(k)$, $W_{f,REQ}$, $F_1(k)$ and $W_{1e}(k)$.

2. The method as set forth in claim 1 wherein the step of delivering fuel to the engine ($W_f(k)$) includes the step of comparing $\lambda_e(k)$ to $\lambda_{lim}(k)$ and, if $\lambda_e(k) \geq \lambda_{lim}(k)$ then delivering fuel to the engine ($W_f(k)$) at a rate equal to $W_{f,REQ}$, else, generating a change in start of fuel injection value ($\delta SOI(k)$) resulting in a decreased exhaust gas air/fuel ratio limit ($\lambda_{lim,new}(k)$) and, if $\lambda_e(k) \geq \lambda_{lim,new}(k)$, then delivering fuel to the engine at a rate equal to $W_{f,REQ}$, and modifying $SOI(k)$ by an amount equal to $\delta SOI(k)$, else, limiting the fuel supplied to the engine according to the following equation:

$$W_f(k) = \min[W_{f,REQ}(k), \max(W_f(k-1), B)]$$

wherein $W_f(k-1)$ represents the previous fueling rate delivered to the engine and B is defined as:

$$B = ((1-F_1(k))W_{1e}(k)/\lambda_{lim,new}(k)) - (F_1(k))W_{1e}(k)/(\Phi_s+1))$$

wherein $\Phi_s$ represents the stoichiometric equivalence ratio.

3. The method as set forth in claim 2 wherein the step of limiting the fuel supplied to the engine further includes the step of modifying the EGR flow and turbocharger flow to increase the airflow into the intake manifold of said engine.

4. The method as set forth in claim 2 wherein the step of generating a compressor airflow value ($W_{c1}(k)$) includes the step of receiving an intake airflow signal from a mass airflow sensor.

5. The method as set forth in claim 1 wherein the step of generating a recirculation flow value ($W_{21}(k)$) includes the step of calculating the recirculation flow value as a function of the intake manifold pressure ($p_1$), exhaust manifold pressure ($p_2$), and EGR valve position.

6. The method as set forth in claim 1 wherein the step of generating a recirculation flow value ($W_{21}(k)$) includes the step of calculating the recirculation flow value in accordance with the following equation:

$$W_{21}(k) = z(k)/T_{21}(k)$$

wherein $z$ represents the scaled enthalpy flow estimate derived from an adiabatic assumption of the engine system and the first law of thermodynamics, and $T_{21}(k)$ represents the EGR system temperature.

7. The method as set forth in claim 1 wherein the step of generating a recirculation flow value ($W_{21}(k)$) includes the step of calculating the recirculation flow value in accordance with the following equation:

$$W_{21}(k)=(1/T_{21}(k))((V_1/(\gamma R))(\underline{dp_1(k)/dt})-\underline{f}(k))$$

wherein $T_{21}(k)$ represents the EGR system temperature, $V_1$ represents the volume of the intake manifold, R represents the difference between the pressure specific heat constant and volume specific heat constant, $\gamma$ represents the ratio of the pressure specific heat constant to volume specific heat constant, $\underline{dp_1(k)}/dt$ represents an estimate of the time rate of change of the intake manifold pressure, and $\underline{f}(k)$ represents the filtered difference between the compressor mass air flow enthalpy and engine intake flow enthalpy.

8. The method as set forth in claim 1 wherein the step of generating an intake burnt gas fraction value ($F_1$) as a function of $W_{c1}(k)$ and $W_{21}(k)$ includes the step of determining the burnt gas fraction in the exhaust manifold ($F_2$); determining the intake manifold pressure ($p_1$); and calculating $F_1$ from a differential equation defined as:

$$dF_1/dt=(RT_1/(p_1V_1))[-(W_{c1}+W_{21})F_1+W_{21}F_2]$$

wherein R equals the difference between the pressure specific heat constant and volume specific heat constant and $V_1$ represents the intake manifold volume.

9. The method as set forth in claim 8 wherein the step of determining the predicted exhaust gas air/fuel ratio ($\lambda_e(k)$) includes calculating $\lambda_e(k)$ in accordance with the following equation:

$$\lambda_e(k) = [(1 - (F_1(k)/(\Phi_s + 1))W_{1e}(k)]/$$
$$...[F_1(k)W_{1e}(k)/(\Phi_s + 1) + W_{f,REQ}(k)]$$

wherein $\Phi_s$ represents the stoichiometric equivalence ratio.

10. A compression ignition engine system comprising:

an engine block having a plurality of combustion chambers formed therein for combusting an air/fuel mixture;

a plurality of fuel injectors corresponding to the plurality of combustion chambers, responsive to a fuel injection signal, for delivering fuel to said combustion chambers;

an intake manifold for delivering intake air to the plurality of combustion chambers;

an exhaust manifold for transmitting exhaust gas from the plurality of combustion chambers;

a turbocharger having a compressor coupled to a turbine, the turbine being in communication with the exhaust gas in the exhaust manifold and the compressor being in communication with the intake manifold such that exhaust gas drives the turbine which causes the compressor to increase the flow of ambient air into the intake manifold;

an exhaust gas recirculation (EGR) conduit having an EGR valve connecting the exhaust manifold and intake manifold of the engine for regulating the rate at which exhaust gas is recirculated into the intake manifold;

a manifold pressure sensor in the intake manifold for providing an intake manifold pressure signal ($p_1$);

a mass airflow sensor located upstream of the compressor for providing a compressor mass airflow signal ($W_{c1}(k)$);

a temperature sensor in the intake manifold for providing an intake aircharge temperature signal ($T_{c1}$); and an engine control unit for generating said fuel injection signal comprising:

a microprocessor programmed to:

generate an intake airflow value ($W_{1e}(k)$) indicative of the airflow from the intake manifold into the combustion chambers;

generate a recirculation flow value ($W_{21}(k)$) indicative of the flow of exhaust gas through the exhaust gas recirculation system;

determine a start of fuel injection value (SOI(k)) as a function of engine speed and fueling rate;

determine the requested fueling rate ($W_{f,REQ}$) as a function of accelerator pedal position and engine speed;

generate an intake burnt gas fraction ($F_1$);

determine the predicted exhaust gas air/fuel ratio ($\lambda_e(k)$);

generate an exhaust gas air/fuel ratio limit ($\lambda_{lim}(k)$);

generate a fuel injection signal ($W_f(k)$) as a function of SOI(k), $\lambda_e(k)$, $\lambda_{lim}(k)$, $W_{f,REQ}(k)$, $W_{1e}(k)$, and $F_1(k)$;

transmit said fuel injection signal to said plurality of fuel injectors.

11. The compression ignition engine system of claim 10 wherein the microprocessor generates a fuel injection signal ($W_f$) as a function of SOI(k), $\lambda_e(k)$, and $\lambda_{lim}(k)$ by comparing $\lambda_e(k)$ to $\lambda_{lim}(k)$ and, if $\lambda_e(k) \geq \lambda_{lim}(k)$, then setting the fuel injection signal ($W_f(k)$) equal to the requested fueling rate ($W_{f,REQ}$) else, generating a change in start of fuel injection value ($\delta$SOI(k)) resulting in a decreased exhaust gas air/fuel ratio limit ($\lambda_{lim,new}(k)$) and, if $\lambda_e(k) \geq \lambda_{lim,new}(k)$, then setting the fuel injection signal ($W_f(k)$) equal to the requested fueling rate $W_{f,REQ}$, and modifying SOI(k) by an amount equal to $\delta$SOI(k), else, setting the fuel injection signal according to the following equation:

$$W_f(k)=\min[W_{f,REQ}(k),\max(W_f(k-1),B)]$$

wherein $W_f(k-1)$ represents the previous fueling rate delivered to the engine and B is defined as:

$$B=((1-F_1(k))W_{1e}(k)/\lambda_{lim,new}(k))-(F_1(k))W_{1e}(k)/(\Phi_s+1))$$

wherein $\Phi_s$ represents the stoichiometric equivalence ratio.

12. The compression ignition engine system of claim 10 wherein the microprocessor generates a recirculation flow value ($W_{21}(k)$) by calculating the recirculation flow value in accordance with the following equation:

$$W_{21}(k)=\underline{z}(k)/T_{21}(k)$$

wherein $\underline{z}$ represents the scaled enthalpy flow estimate derived from an adiabatic assumption of the engine system and the first law of thermodynamics, and $T_{21}(k)$ represents the EGR system temperature.

13. The compression ignition engine system of claim 10 wherein the microprocessor generates a recirculation flow value ($W_{21}(k)$) by calculating the recirculation flow value in accordance with the following equation:

$$W_{21}(k)=(1/T_{21}(k))((V_1/(\gamma R))(\underline{dp_1(k)/dt})-\underline{f}(k))$$

wherein $T_{21}(k)$ represents the temperature of the exhaust gas flowing from the exhaust manifold to the intake manifold, $V_1$ represents the volume of the intake manifold, R represents the difference between the pressure specific heat constant and volume specific heat constant, $\gamma$ represents the ratio of the pressure specific heat constant to volume specific heat constant, $dp_1/dt(k)$ represents an estimate of the time rate of change of the intake manifold pressure, and $\underline{f}(k)$ represents the filtered difference between the compressor mass air flow enthalpy and engine intake flow enthalpy.

14. The compression ignition engine system of claim 10 wherein the microprocessor generates an intake burnt gas fraction value ($F_1$) as a function of $W_{c1}(k)$ and $W_{21}(k)$ by estimating the burnt gas fraction in the exhaust manifold ($F_2$), determining the intake manifold pressure ($p_1$); and calculating $F_1$ as a differential equation defined as:

$$dF_1/dt = (RT_1/(p_1 V_1))[-(W_{c1}+W_{21})F_1 + W_{21}F_2]$$

wherein R equals the difference between the pressure specific heat constant and volume specific heat constant and $V_1$ represents the intake manifold volume.

15. The compression ignition engine system of claim 14 wherein the microprocessor generates the predicted exhaust gas air/fuel ratio ($\lambda_e(k)$) by calculating $\lambda_e(k)$ in accordance with the following equation:

$$\lambda_e(k) = [(1 - (F_1(k)/(\Phi_s+1))W_{1e}(k)] /$$
$$\ldots [F_1(k)W_{1e}(k)/(\Phi_s+1) + W_{f,REQ}(k)]$$

wherein $\Phi_s$ represents the stoichiometric equivalence ratio.

* * * * *